US011493759B2

(12) United States Patent
Kawamura et al.

(10) Patent No.: US 11,493,759 B2
(45) Date of Patent: Nov. 8, 2022

(54) HOLOGRAM LIGHT GUIDE PLATE WITH PLURALITY OF LAYERS AND HEAD MOUNT DISPLAY USING HOLOGRAM LIGHT GUIDE PLATE

(71) Applicant: Hitachi-LG Data Storage, Inc., Tokyo (JP)

(72) Inventors: Tomoto Kawamura, Tokyo (JP); Takeru Utsugi, Tokyo (JP); Mitsuru Nagasawa, Tokyo (JP); Hiromichi Yamakawa, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 295 days.

(21) Appl. No.: 16/902,319

(22) Filed: Jun. 16, 2020

(65) Prior Publication Data
US 2021/0033864 A1    Feb. 4, 2021

(30) Foreign Application Priority Data

Jul. 29, 2019    (JP) .............................. JP2019-138527

(51) Int. Cl.
*G02B 27/01*    (2006.01)
*G02B 6/12*    (2006.01)

(52) U.S. Cl.
CPC ........... *G02B 27/0103* (2013.01); *G02B 6/12* (2013.01); *G02B 2006/12038* (2013.01); (Continued)

(58) Field of Classification Search
CPC ................. G02B 27/0103; G02B 6/12; G02B 2027/0105; G02B 2006/12061; (Continued)

(56) References Cited

U.S. PATENT DOCUMENTS 5,604,611 A * 2/1997 Saburi .................. G03H 1/0256
359/13
5,898,511 A * 4/1999 Mizutani .................. G03H 1/26
359/13
(Continued)

FOREIGN PATENT DOCUMENTS

CA        2778284 A1    4/2011
CN        1989429 A     6/2007
(Continued)

OTHER PUBLICATIONS

Zhanjun Yan et al., "Optical Design of Dual-Channel Waveguide Holographic Display Configuration", Proceedings of China Display/Asia Display, 2011.
(Continued)

*Primary Examiner* — Kwang-Su Yang
(74) *Attorney, Agent, or Firm* — Mattingly & Malur, PC

(57) ABSTRACT

It is an objective of this disclosure to protect a highly transparent hologram light guide plate from water vapor and ultraviolet ray, thereby suppressing deterioration of the hologram light guide plate even when employed in a head mount display used in outdoor environments. A hologram light guide plate according to this disclosure comprises a protection layer that protects a hologram layer and an intermediate layer that is placed between a glass layer and the protection layer, wherein the glass layer and the hologram layer form a transfer layer that transfers image light. The intermediate layer causes the image light to transfer only in the transfer layer in a section from an input area of the image light to an output area of the image light.

15 Claims, 7 Drawing Sheets

(52) U.S. Cl.
CPC .............. *G02B 2006/12061* (2013.01); *G02B 2027/0105* (2013.01); *G02B 2027/0145* (2013.01); *G02B 2027/0178* (2013.01)

(58) Field of Classification Search
CPC .. G02B 2027/0178; G02B 2006/12038; G02B 2027/0145
See application file for complete search history.

(56) References Cited

U.S. PATENT DOCUMENTS

| | | | |
|---|---|---|---|
| 6,885,414 B1 | 4/2005 | Li | |
| 2005/0202263 A1* | 9/2005 | Sargent | C08J 7/044 |
| | | | 428/323 |
| 2006/0249951 A1* | 11/2006 | Cruikshank | B42D 25/29 |
| | | | 283/92 |
| 2009/0009865 A1 | 1/2009 | Nishida et al. | |
| 2011/0273864 A1* | 11/2011 | Izawa | G02B 5/201 |
| | | | 252/301.4 R |
| 2014/0168735 A1* | 6/2014 | Yuan | G02B 27/01 |
| | | | 359/13 |
| 2015/0309400 A1 | 10/2015 | Kawamura et al. | |
| 2016/0139322 A1 | 5/2016 | Bang et al. | |
| 2016/0238844 A1 | 8/2016 | Dobschal | |
| 2017/0363811 A1 | 12/2017 | Ayres et al. | |
| 2019/0101760 A1* | 4/2019 | Ayres | G03H 1/0402 |
| 2019/0146221 A1* | 5/2019 | Oku | H04N 5/64 |
| | | | 359/13 |
| 2019/0227309 A1* | 7/2019 | Kadono | G09G 3/36 |

FOREIGN PATENT DOCUMENTS

| | | |
|---|---|---|
| CN | 101861655 A | 10/2010 |
| CN | 103038568 A | 4/2013 |
| CN | 103688102 A | 3/2014 |
| CN | 104614857 A | 5/2015 |
| CN | 105045023 A | 11/2015 |
| CN | 109031663 A | 12/2018 |
| WO | 2006/007742 A1 | 1/2006 |
| WO | 2008/157621 A2 | 12/2008 |
| WO | 2011/130718 A2 | 10/2011 |

OTHER PUBLICATIONS

Yuan Xiong, "Research on Holography and Optics in Flat Panel Displays", Dissertation submitted to Shanghai Jiao Tong University, Dec. 2012 [with English abstract].

* cited by examiner

HOLOGRAM LIGHT GUIDE PLATE WITH PLURALITY OF LAYERS AND HEAD MOUNT DISPLAY USING HOLOGRAM LIGHT GUIDE PLATE

CROSS-REFERENCE TO RELATED APPLICATION

This application claims the priority of Japanese Patent Application No. 2019-138527 filed Jul. 29, 2019, which is incorporated herein by reference in its entirety.

BACKGROUND OF THE DISCLOSURE

1. Technical Field

The present disclosure relates to a hologram light guide plate that transfers images to eyes, and also relates to a head mount display using the hologram light guide plate.

2. Description of the Related Art

As a wearable device, head mount display is expected to be employed in various applications, in that it can provide network information on the Internet within a part of field of vision. A component that transfers image light at the field of vision of the head mount display is referred to as a light guide plate.

In order to always display images within a part of field of vision, it is required for the light guide plate to have very high transparency. Conventionally, various schemes are proposed for light guide plate, such as a light guide plate using prism, a light guide plate using diffraction by means of groove structure, a light guide plate using reflective mirror array, or a hologram light guide plate using diffraction by means of refractive index modulation. Among those schemes, the hologram light guide plate is promising as a technique that can achieve transparency at a same level as typical eye glasses. US2017/0363811A1 (PTL1) is one of documents proposing a holographic light guide plate.

SUMMARY OF DISCLOSURE

It is commonly known that a hologram material, which implements refractive index modulation, degrades due to water vapor or ultraviolet ray. The hologram light guide plate described in PTL1 does not consider suppressing deterioration due to water vapor or ultraviolet ray. Then it is conceivable that a protection layer may be provided to protect the hologram material.

A hologram light guide plate confines image light within the plate to transfer the light. Accordingly, during the image light transfers, it is necessary to confine the image light within a transfer layer. However, if a protection layer that shuts out water vapor or ultraviolet ray is provided at outside of the hologram light guide plate, the image light may also transfer to the protection layer during the transfer process. Consequently, the image could be blurred when the image light reaches eyes of user.

This disclosure is made in the light of the technical problem above. It is an objective of this disclosure to protect a highly transparent hologram light guide plate from water vapor and ultraviolet ray, thereby suppressing deterioration of the hologram light guide plate even when employed in a head mount display used in outdoor environments.

A hologram light guide plate according to this disclosure comprises a protection layer that protects a hologram layer and an intermediate layer that is placed between a glass layer and the protection layer, wherein the glass layer and the hologram layer form a transfer layer that transfers image light. The intermediate layer causes the image light to transfer only in the transfer layer in a section from an input area of the image light to an output area of the image light.

With the hologram light guide plate according to this disclosure, it is possible to achieve a head mount display usable in outdoor environments for long time, by implementing a highly transparent hologram light guide plate whereas protecting the hologram layer from water vapor and ultraviolet ray.

DESCRIPTION OF THE EMBODIMENTS

Embodiment 1

Figure 1:
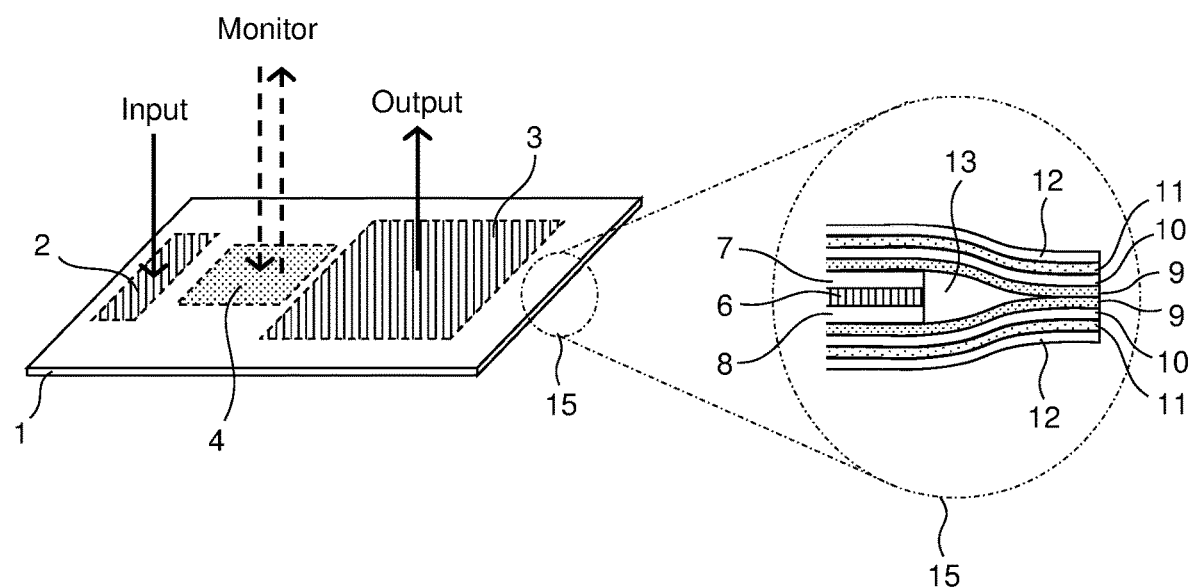
FIG. 1 is a schematic diagram of a hologram light guide plate 1 according to an embodiment 1.

FIG. 1 is a schematic diagram of a hologram light guide plate 1 according to an embodiment 1 of this disclosure. The hologram light guide plate 1 includes an input area 2, an output area 3, and a monitor area 4. The input area 2 is an area into which image light is inputted. The output area 3 is an area from which the image light is outputted. The monitor area 4 is an area that is used for monitoring parallelism of the hologram light guide plate 1 by means of external light.

The right part of FIG. 1 illustrates a structure of a cross section 15 of the hologram light guide plate 1. The hologram light guide plate 1 is formed by a hologram layer 6, glass layers 7 and 8, an intermediate layer 9, a water vapor barrier layer 10, an ultraviolet ray barrier layer 11, a surface augment layer 12, and a dry area 13.

The glass layer 7 is placed at one side of the hologram layer 6, and the glass layer 8 is placed at another side of the hologram layer 6. In the embodiment 1, the glass layer 7 is a layer placed at a side into which the image light is inputted, and the glass layer 8 is a layer placed at a side external from a user 61 (refer to FIG. 6 below).

The hologram layer 6 has a functionality to transfer the image light to eyes by means of refraction index modulation. The hologram layer 6 is formed from a hologram material (photo polymer). Monomer or oligomer reacts under photopolymerization by irradiating interference light with a wavelength around 405 nm, and then changes its structure into polymer, thereby achieving refractive index modulation in compliance with the interference light. Irradiating the interference light with a predetermined distribution to achieve refractive index modulation is typically referred to as light recording. In other words, light recording is to fix an interference state of the light within the hologram layer 6. The input area 2 and the output area 3 are areas where light recording is performed by a predetermined interference light. The monitor area 4 is an area where light recording is not performed. The monitor area 4 does not modulate external light.

The glass layers 7 and 8 are transparent plates placed at outside of the hologram layer 6. A cost effective material may be advantageously used as the glass layers, such as BK7 from Schott Corporation. A transparent optical resin may be used as the glass layers. In that case, in order to achieve refractive index modulation in the hologram layer 6, a material may be used which transparency is high around 405 nm (the wavelength used for light recording). For example, Zeonex from Zeon Corporation or APEL from Mitsui Chemicals Corporation may be used. When increasing FOV (Field Of View), which indicates the size of image light, a material may be used which refractive index is high in accordance with such FOV.

The image light transfers within the glass layers 7 and 8. Accordingly, a material may be used as the material of the glass layers which anisotropy is very small within the glass layers 7 and 8, so as to avoid unnecessary modulations. In addition, each of the external surfaces of the glass layers 7 and 8 (the surfaces contacting with the intermediate layer 9) preferably keeps very high parallelism to each other. Since it is difficult to achieve parallelism below several seconds, it is desirable to monitor the angle of the glass layers by means of external light via the monitor area 4. Especially when using transparent optical resin, it is beneficial to keep a wide range of the monitor area 4 so as to monitor whether a distortion has occurred. By recording amount of reflected light during the inspection process, it is possible to utilize the monitor area 4 so as to monitor the deterioration state of the hologram layer 6. The attenuated amount of light indicates the deterioration.

The water vapor barrier layer 10 has a functionality that prevents water vapor from proceeding from external environments into the hologram layer 6. A transparent resin is preferable as the water vapor barrier layer 10. Polyvinylidene chloride may be preferable.

The ultraviolet ray barrier layer 11 is transparent against visible light (430 to 650 nm), and has a functionality that prevents ultraviolet ray (up to 430 nm), which destructs the hologram layer 6, from proceeding from external environments. For example, by forming a multilayer of $SiO_2$ and $TiO_2$, the ultraviolet ray barrier layer 11 is achieved. As the ultraviolet ray barrier layer 11, a material may be used which transmittance against visible light (i.e. image light) is higher than that against ultraviolet ray.

The surface augment layer 12 is transparent, and has a functionality that prevents damages to the surface of the hologram light guide plate 1. For example, by forming the surface augment layer 12 using silicone hard coat, it is possible to both achieve high transparency and hardness.

The water vapor barrier layer 10, the ultraviolet barrier layer 11, and the surface augment layer 12 work as a protection layer that protects the hologram layer 6. The protect layer (i.e. the three layer structure of the water vapor barrier layer 10, the ultraviolet barrier layer 11, and the surface augment layer 12) is formed at both sides of the hologram light guide plate 1. These three layers forming the protect layer are placed in this order from the inner side to the external side of the hologram light guide plate 1.

The intermediate layer 9 is placed between the glass layer 7 and the protect layer, and also is placed between the glass layer 8 and the protect layer. The intermediate layer 9 has a functionality that prevents the image light from spreading into the protect layer. This functionality is achieved by configuring the refractive index of the glass layers 7 and 8 smaller than that of the intermediate layer 9. The intermediate layer 9 may also have a functionality that achieves close contact between the protect layer and the glass layers 7 and 8. Thermosetting transparent silicone resin may be used as the intermediate layer 9. Transparent silicone resin is advantageous in adjusting its refractive index by adjusting the composition of its material. The intermediate layer 9 may also be an air layer.

The intermediate layer 9 and the protect layer are formed so that the surface area sizes of them are slightly larger than those of the stacked body of glass layer 7/hologram layer 6/glass layer 8. By binding together the redundant portion of the intermediate layer 9 and the protect layer at the end edge of the hologram light guide plate 1, an inner space is formed between the stack body of glass layer 7/hologram layer 6/glass layer 8 and the end edge of the hologram light guide plate 1. This inner space is referred to as a dry area 13. The dry area 13 is a part of the intermediate layer 9. The dry area 13 absorbs water moisture. In order to sufficiently dry so that no moisture is left, highly hygroscopic material is preferable for the dry area 13, such as silica gel. Other hygroscopic materials may also be employed.

Figure 2:
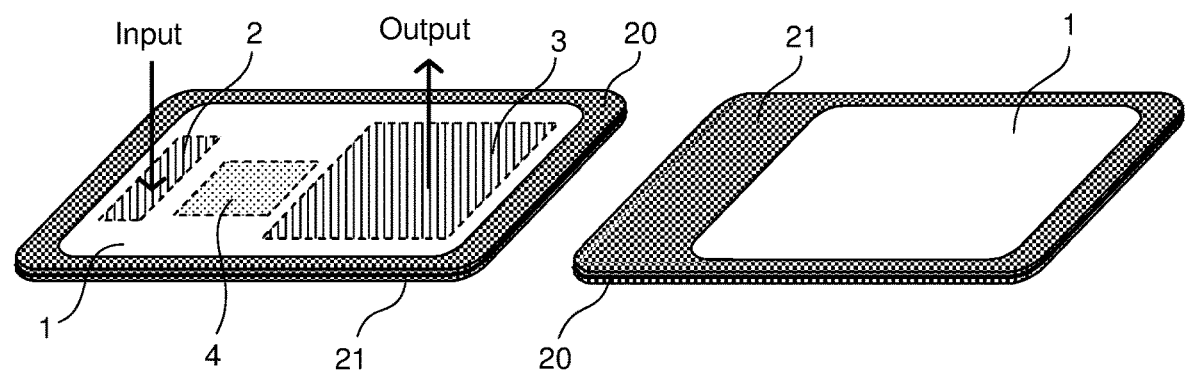
FIG. 2 is a schematic diagram illustrating a scene where a frame is mounted to the hologram light guide plate 1.

FIG. 2 is a schematic diagram illustrating a scene where a frame is mounted to the hologram light guide plate 1. Frames 20 and 21 are mounted around the hologram light guide plate 1. The frames 20 and 21 have functionalities for: (a) improving the appearance so that the protect layer is not viewable to users; (b) removing unnecessary light caused by incident light spreading from the side surface; (c) preventing the incident light from proceeding into the opposite surface; (d) supporting the hologram light guide plate 1. Therefore, the frames 20 and 21 are formed by opaque materials, and are formed into a shape surrounding the side surface of the hologram light guide plate 1. The frame 21 has a shape covering the side opposite to the input area 2. The frames 20 and 21 could be cost-effectively achieved by manufacturing them from molding thermoplastic resin.

Figure 3:
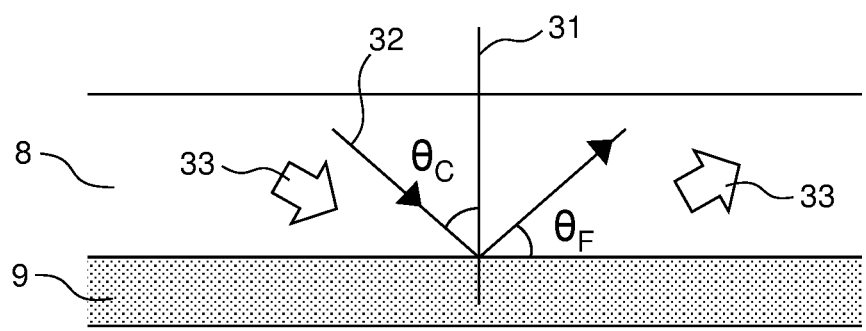
FIG. 3 is a diagram illustrating a function of an intermediate layer 9.

FIG. 3 is a diagram illustrating a functionality of the intermediate layer 9. The image light incident from the input area 2 transfers by reflecting within the glass layer 7, the glass layer 8, and the hologram layer 6, until emitting from the output area 3.

FIG. 3 illustrates a behavior of light at a boundary between the glass layer 8 and the intermediate layer 9. Since the refractive index of the intermediate layer 9 is relatively lower than that of the glass layer 8, the image light 33 totally reflects at the boundary between the glass layer 8 and the intermediate layer 9. The internal distortion of the protect layer is generally large. Thus when the image light transmits through the protect layer, the image light is randomly modulated and the image is deteriorated. The intermediate layer 9 reflects the image light, thereby preventing the image light from transmitting into the protect layer. Accordingly, the intermediate layer 9 prevents deterioration of the image.

It is assumed that the refractive index of the glass layer 8 is N1, and the refractive index of the intermediate layer 9 is N2. In this case, the critical angle θc (the angle between the image light and the normal line 31) at which the image light totally reflects at the boundary between the glass layer 8 and the intermediate layer 9 is described by Equation 1 below.

$$N1 \cdot \sin\theta c = N2 \quad (1)$$

It is assumed that an angle $\theta_F$ is an angle (the angle formed by the reflected light with respect to the boundary between the glass layer 8 and the intermediate layer 9) that represents a FOV corresponding to the size of the image light. $\theta_F$ is described by Equation 2 below. The unit in Equation 2 is "degree".

$$\theta_F < 90 - \theta c \quad (2)$$

For example, if the glass layer 8 is formed of BK7, N1 is approximately 1.52 at visible light region. If it is requested to configure $\theta_F$ at 20 degree, N2=1.42 and $\theta c$=70 degree from Equations 1 and 2. When increasing the image size (i.e. increasing $\theta_F$), the refractive index N2 is set at or below 1.42 according to the relationship above. $\theta_F$ is more readily increased by selecting materials with high refractive index N1. As discussed above, by adjusting the refractive indexes N1 and N2, it is possible to achieve desired size of the image light.

Figure 4:
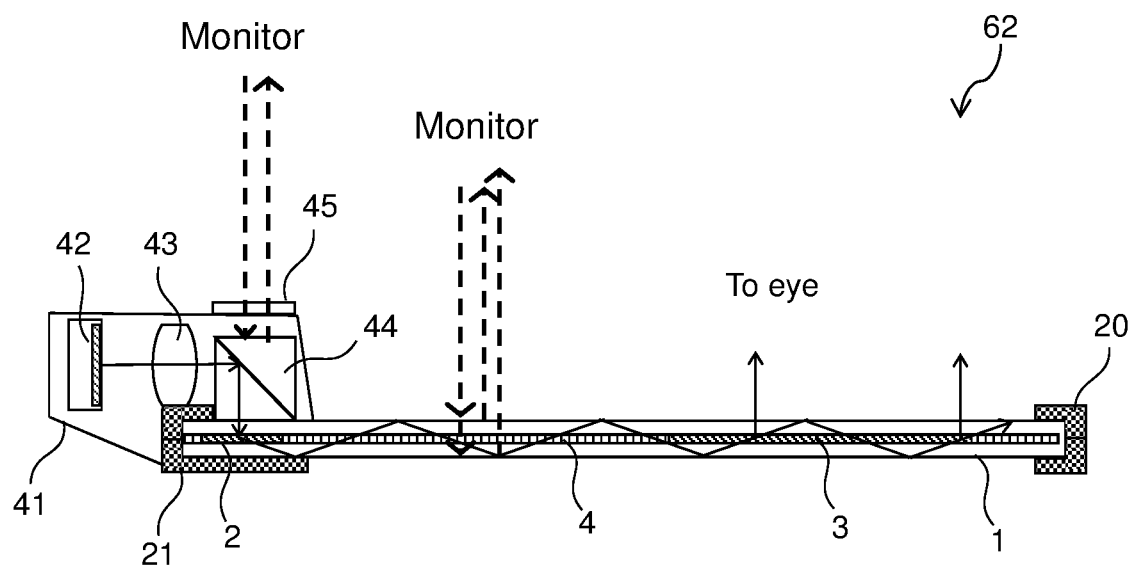
FIG. 4 is a schematic diagram illustrating a structure of a head mount display 62.

FIG. 4 is a schematic diagram illustrating a structure of a head mount display 62. The head mount display 62 at least includes the hologram light guide plate 1, the frames 20 and 21, and an optical engine 41.

The image light (arrow mark) generated by the optical engine 41 is inputted into the input area 2 of the hologram light guide plate 1, and is outputted from the output area 3 into eyes of the user. In the section from the input area 2 to the output area 3, the image light totally reflects at the boundary between the glass layers and the intermediate layer 9, as described with FIG. 3. Accordingly, glass layer 7/hologram layer 6/glass layer 8 work as a transfer layer that transfers the image light within the hologram light guide plate 1.

The optical engine 41 includes an image light source 42, an imaging lens 43, a light guide prism 44, and a monitor opening 45.

The image light source 42 is an optical device that generates the image light. Recently developed devices may be employed as the image light source 42, such as OLED (Organic Light Emitting Diode) or micro LED. It is also possible to combine the illumination optical system with LCOS (Liquid Crystal On Silicon), transmissive liquid crystal, DMD (Digital Micromirror Device), and the like. OLED or micro LED are beneficial in decreasing the size of the optical engine 41.

The imaging lens 43 has a lens functionality that transfers, to the eyes of the user, the image light generated by the image light source 42 within desired FOV range. In head mount display, the imaging lens 43 is designed so that the image is a virtual image. Details of the design for the imaging lens 43 are not described in this document, since it is a commonly known technique.

The light guide prism 44 is an optical element that guides the image light into the hologram light guide plate 1. In FIG. 4, the image light is incident onto the hologram light guide plate 1 perpendicularly. However, the incident angle could be oblique. This is advantageous in unnecessitating the input area 2, because there exists a condition where it is not necessary to perform refractive index modulation to the input area 2 by finely design the inclination of the optical axis, for example It is preferable for the light guide prism 44 to have a prism structure that has a surface in parallel with the hologram light guide plate 1. By monitoring the angle of the light guide prism 44 using external light via the monitor opening 45 and by inspecting the parallelism of the monitored angle using the monitor area 4, it is possible to finely confirm whether the image light is incident onto the hologram light guide plate 1 at a predetermined angle.

Figure 5:
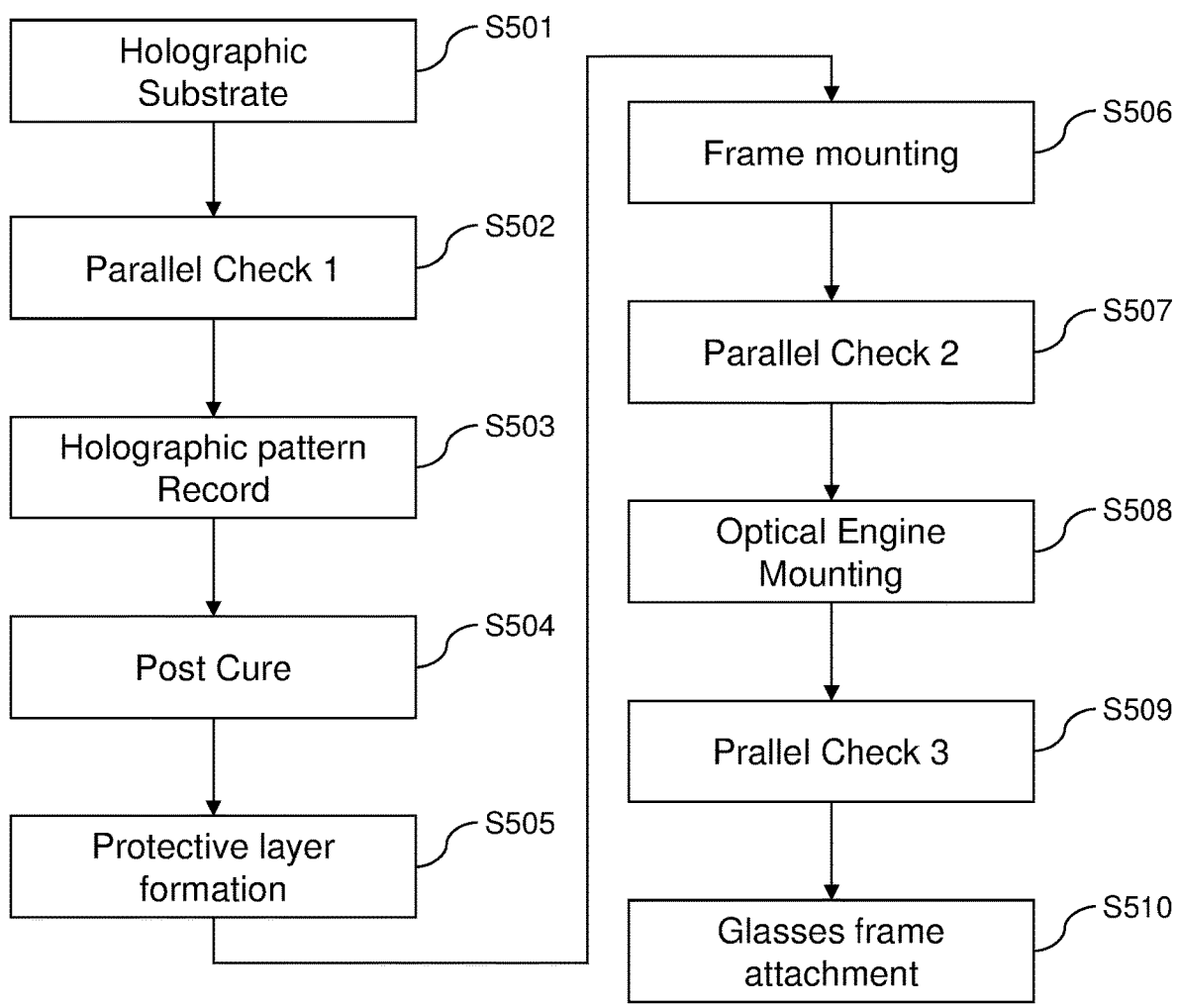
FIG. 5 is a flowchart illustrating a process for manufacturing the head mount display 62.

FIG. 5 is a flowchart illustrating a process for manufacturing the head mount display 62. Hereinafter, each step in FIG. 5 will be described.

A hologram substrate is prepared, which is configured by the hologram layer 6 and the glass layers 7 and 8 (S501). Then the parallelism of the glass layers 7 and 8 (whether the external surfaces of both layers are placed in parallel to each other) is checked using the monitor area 4, thereby confirming that the parallelism is at desired value (S502).

The input area 2 and the output area 3 of the hologram layer 6 are recorded so that those areas have a desired refractive index distribution (S503). In this process, if the ultraviolet ray barrier layer 11 exists, it is impossible to irradiate interference light having wavelength around 405 nm onto the hologram layer 6. Accordingly, it is necessary to form the ultraviolet ray barrier layer 11 after the recording.

In order to avoid unintentional recording in the hologram layer 6, overall area of the hologram layer 6 is completely recorded using light having wavelength around 405 nm (S504: post cure).

The protect layer is formed including the intermediate layer 9 (S505). The hologram layer 6 is degraded when exposed to ultraviolet ray or water vapor after the post cure. The protect layer is to prevent such degradation.

The frames 20 and 21 are mounted (S506). The parallelism of the glass layers 7 and 8 is inspected again (S507). During the manufacturing process, the parallelism could be degraded due to unnecessary deflation of the hologram layer 6, for example Thus the parallelism is inspected again in S507. The parallelism inspection may be performed via the monitor area 4, as in S502. If the parallelism is degraded, then the device in the process is discarded as a defective product.

The optical engine 41 is mounted (S508). The parallelism is reviewed in each of the monitor opening 45 and the monitor area 4 (509). Finally, the optical engine 41 and the hologram light guide plate 1 are mounted onto the frame (S510). Then manufacturing process for the head mount display 62 is completed.

Figure 6:
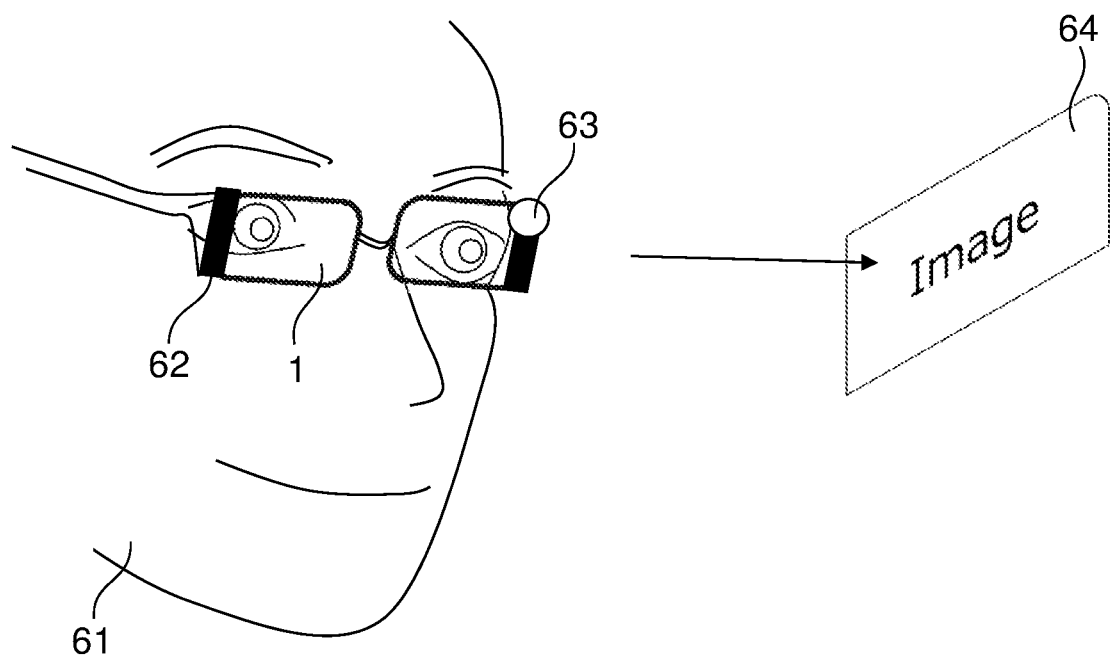
FIG. 6 is a diagram illustrating a scene where a user 61 equips the head mount display 62.

FIG. 6 is a diagram illustrating a scene where a user 61 equips the head mount display 62. When the user 61 equips the head mount display 62 as glasses, the user sees an image 64 in the space produced by the image light outputted from the outpour area 3 of the hologram light guide plate 1. The head mount display 62 includes a camera 63. The camera 63 monitors external environments. Image processing of the external environment provides appropriate views to the user.

Figure 7:
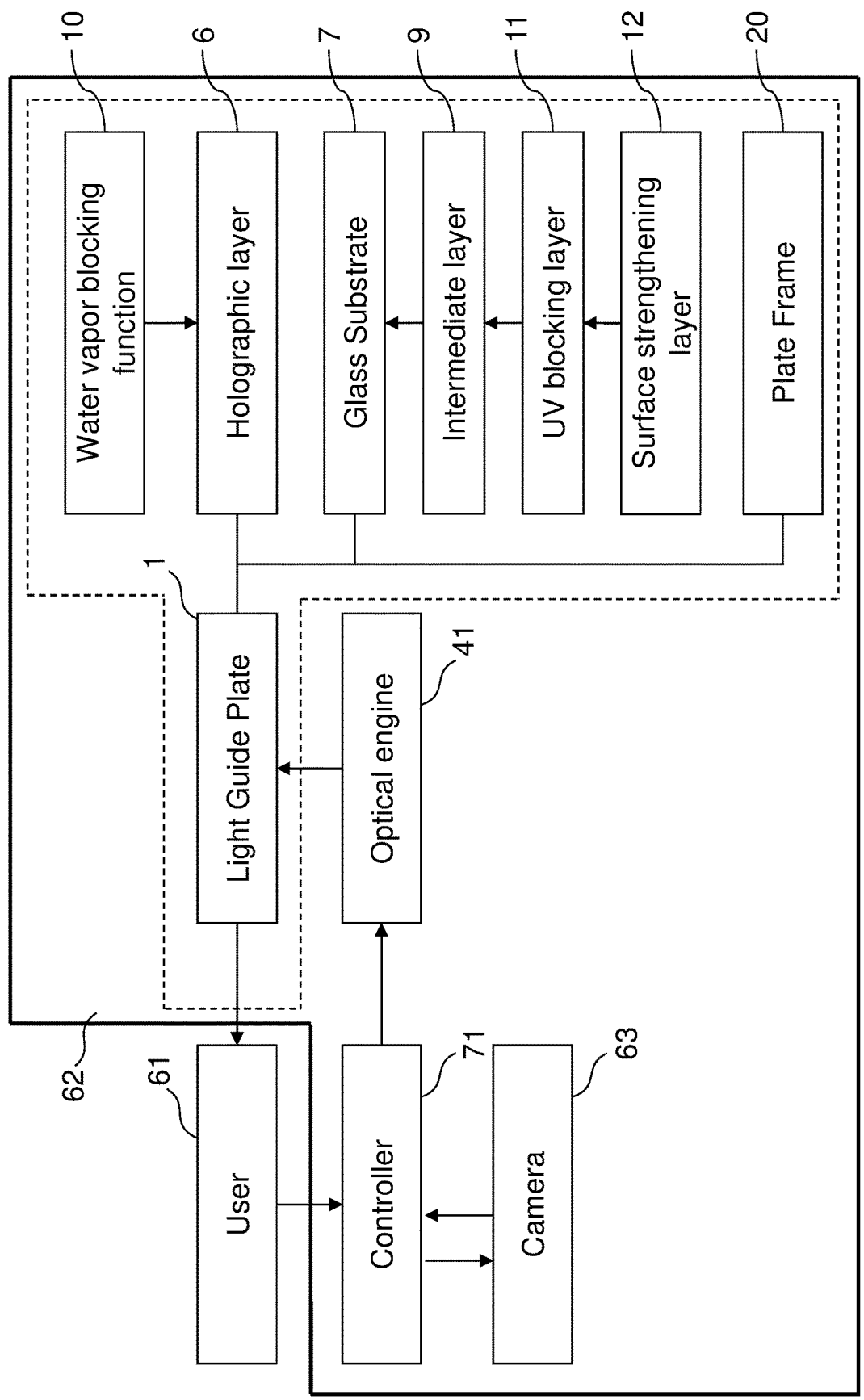
FIG. 7 is a system block diagram of the head mount display 62.

FIG. 7 is a system block diagram of the head mount display 62. The head mount display 62 includes a controller 71, the camera 63, the hologram light guide plate 1, and the optical engine 41. The hologram light guide plate 1 includes the hologram layer 6, the glass layers 7 and 8, the intermediate layer 9, the ultraviolet ray barrier layer 11, the water vapor barrier layer 10, the surface augment layer 12, and the frames 20 and 21.

When the user 61 equipping the head mount display 61 performs a predetermined action, the controller 71 activates the camera 63, and then performs image analysis processing to determine the information provided to the user. The controller 71 activates the optical engine 41 to produce the image light. The image light transfers via the hologram light guide plate 1 to provide the user 61 with the information. The hologram light guide plate 1 includes the ultraviolet ray barrier layer 11 and the water vapor barrier layer 10 so that ultraviolet ray or water vapor will not proceed into the hologram layer 6. The intermediate layer 9, which refractive index is lower than that of the glass layers 7 and 8, is provided at external sides of the glass layers 7 and 8, so that the image light reflects at inner surfaces of the hologram light guide plate 1 to transfer within the hologram light guide plate 1.

Embodiment 1—Summary

The hologram light guide plate 1 according to the embodiment 1 includes the intermediate layer 9 between the glass layers 7 and 8 and the protect layer. In the section between the input area 2 and the output area 3, the image light totally reflects at the boundary surface between the intermediate layer 9 and the glass layers 7 and 8. Accordingly, the image light transfers through only the hologram layer 6 and the glass layer (7 or 8) within that section. Therefore, it is possible to prevent the image light from leaking out into the protect layer before reaching the eye of the user 61, thereby preventing degradation of the image quality.

The hologram light guide plate 1 according to the embodiment 1 protects the hologram layer 6 from ultraviolet ray by means of the protect layer, thereby it is possible to increase the transparency of the hologram light guide plate 1. Even if ultraviolet ray transmits through a highly transparent portion, the hologram layer 6 is protected by the protect layer. Thus there is no risk of unnecessary recording, thereby achieving the high transparency of the hologram light guide plate 1. Further, it is possible to prevent the image light from leaking out into the protect layer by means of the intermediate layer 9. Thus there is no risk of degradation of image quality. Accordingly, it is possible to achieve a head mount display which is usable for long time in outdoor environments.

The hologram light guide plate 1 according to the embodiment 1 monitors external light incident onto the monitor area 4 when the external light reflects from the hologram light guide plate 1, thereby monitoring the parallelism of the glass layers 7 and 8. Further, via the monitor opening 45, it is possible to monitor the mount angle of the light guide prism 44 with respect to the hologram light guide plate 1. By using both of them, it is possible to precisely monitor the image quality.

Embodiment 2

In an embodiment 2 of this disclosure, a modification of the hologram light guide plate 1 will be described. In the embodiment 2, same reference numerals will be assigned to components which are same as those in the embodiment 1, and repetitive description thereof may be omitted. Therefore, differences from the embodiment 1 will be mainly described below.

Figure 8:
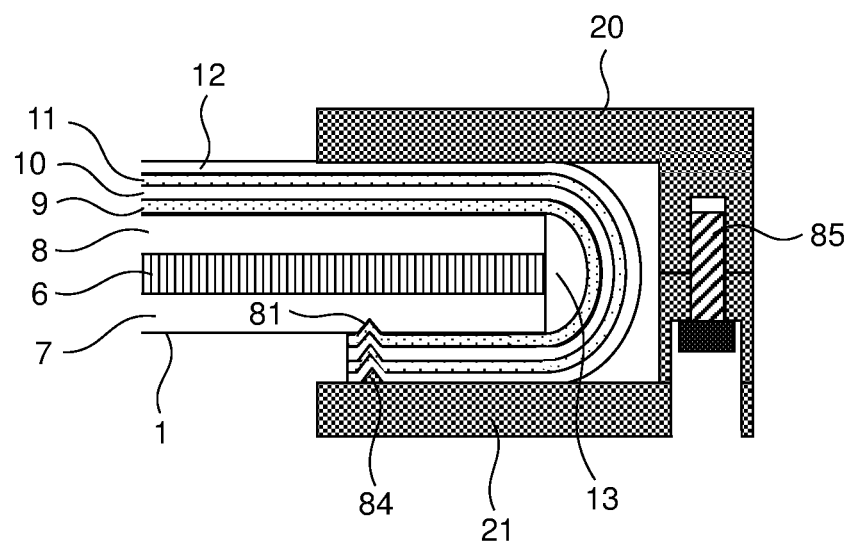
FIG. 8 is a side sectional view illustrating a configuration of a modified example of the hologram light guide plate 1.

FIG. 8 is a side sectional view illustrating a configuration of a modified example of the hologram light guide plate 1. Comparing with the hologram light guide plate 1 in FIG. 1, the configuration in FIG. 8 is different from FIG. 1 in that no protect layer is provided at the side of the glass layer 7. Further, the glass layer 7 includes a small groove 81, and the frame 21 includes a small protrusion 84. A screw 85 is attachable to the frames 20 and 21. By aligning the small groove 81 with the small protrusion 84 and fastening the screw 85, the glass layer 7 and the intermediate layer 9 are pressed with each other, thereby prevent water vapor from proceeding between the glass layer 7 and the intermediate layer 9.

According to the configuration in FIG. 8, when the user 61 in an outdoor environment equips the head mount display 62, ultraviolet ray does not reach the hologram layer 6. Thus it is not necessary to protect the hologram layer 6 at the side of the user 61 from ultraviolet ray. Accordingly, the protect layer at the side of the user 61 may be omitted. This is cost-effective.

Figure 9:
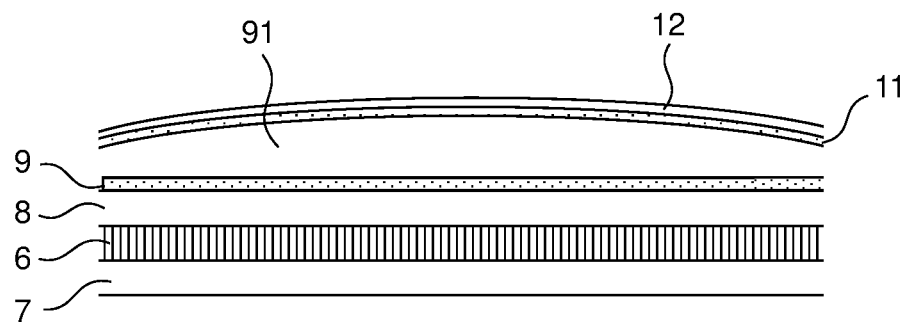
FIG. 9 is a configuration example where the hologram light guide plate 1 is integrated with glasses.

FIG. 9 is a configuration example where the hologram light guide plate 1 is integrated with glasses. The hologram light guide plate 1 in FIG. 9 includes a lens 91 in addition to the configuration in FIG. 1. This configuration integrates the glasses with the hologram light guide plate 1 so as to keep normal field of view for a user with poor eyesight. Accordingly, it is possible to integrate the glasses with the head mount display 62.

A lens of glasses typically has a meniscus structure. However, in order to integrate the hologram light guide plate 1 with the lens of glasses, it is necessary to keep flatness of the surface at the side of the user 61 so that the image light is not disturbed. Therefore, the lens 91 has a convex structure. The surface where the lens 91 contacts with the intermediate layer 9 is flat, and the opposite side is a convex surface. The lens 91 has a refractive index higher than that of the glass layer 8. Thus by placing the intermediate layer 9 between the glass layer 8 and the lens 91, it is possible to prevent the image light from proceeding into the lens 91. The protect layer may be placed at external side of the lens 92 by techniques as in typical glasses.

Figure 10:
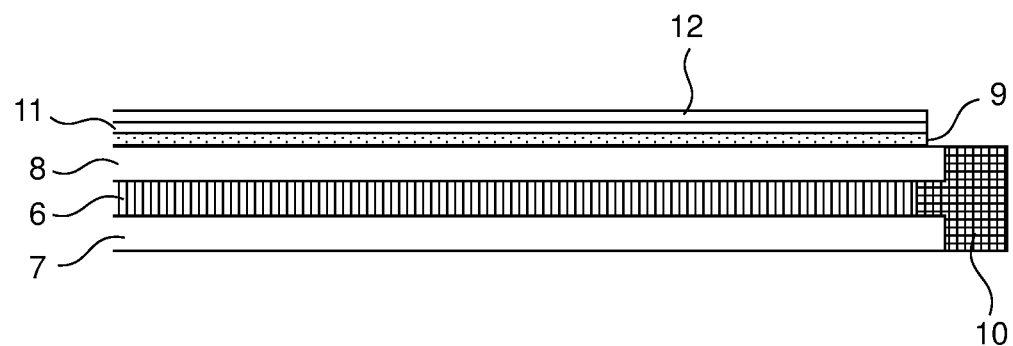
FIG. 10 is a configuration example of the hologram light guide plate 1 in which a water vapor barrier layer 10 is placed at a side of the hologram light guide plate 10.

FIG. 10 is a configuration example of the hologram light guide plate 1 in which the water vapor barrier layer 10 is placed at a side of the hologram light guide plate 1. In this case, the water vapor barrier layer 10 protrudes into a part of the hologram layer 6, thereby preventing water vapor from reaching the hologram layer 6. For example, the water vapor barrier layer 10 is placed at a side surface of the hologram light guide plate 1, and a part of the water vapor barrier layer 10 is protruded, so that a top surface (most protruded surface) of the protruded portion contacts with the side surface of the hologram layer 6. Accordingly, it is possible to absolutely barrier the hologram layer 6 from water vapor.

Further, in the configuration of FIG. 10, the protect layer is placed at the side of the glass layer 8 only. This is cost-effective as in FIG. 8. The protect layer may also be placed at both sides.

Modification of Disclosure

The disclosure is not limited to the embodiments described above, and includes various modifications. For example, the above-described embodiments have been described in detail for easy understanding of the disclosure, and are not necessarily limited to those having all the configurations described above. A part of the configuration of a certain embodiment can be replaced with the configuration of another embodiment, and the configuration of another embodiment can be added to the configuration of a certain embodiment. A part of the configuration of each embodiment can be added, deleted, or replaced with another configuration.

In the embodiments above, the light guide prism 44 may be directly in contact with the glass layers 7 or 8 of the hologram light guide plate 1. Direct contact means that there is no other material layer between the light guide prism 44 and the glass layers 7 or 8. Accordingly, there is no material such as air layer between the light guide prism 44 and the glass layers 7 or 8. Thus it is possible to avoid disadvantages such as degradation of image quality due to unintentional refraction of the image light.

REFERENCE SIGNS LIST

1: hologram light guide plate
2: input area
3: output area
4: monitor area
6: hologram layer
7: glass layer (input side)
8: glass layer
9: intermediate layer
10: water vapor barrier layer
11: ultraviolet ray barrier layer
12: surface augment layer
13: dry area
15: sectional surface
20: frame (input side)
21: frame
31: normal line
32: light ray
33: image light
41: optical engine
42: image light source
43: imaging lens
44: light guide prism
45: monitor opening
61: user
62: head mount display
63: camera
64: image
71: controller
81: small groove
84: small protrusion
85: screw
91: lens

What is claimed is:
1. A hologram light guide plate that guides image light to an eye, comprising:
  a hologram layer that converts a proceed direction of the image light by refractive index modulation;
  a glass layer that is placed at an external side of the hologram layer;
  a protect layer that is placed at an external side of the glass layer and that protects the hologram layer;
  an intermediate layer that is placed between the glass layer and the protect layer; and
  a dry area that is placed at a side surface of the glass layer and also at a side surface of the hologram layer, and that absorbs water vapor,
  wherein the hologram light guide plate includes an input area where the image light is incident onto the hologram light guide plate and an output area where the image light exits the hologram light guide plate,
  wherein the hologram layer and the glass layer form a transfer layer through which the image light transfers, and
  wherein the intermediate layer causes the image light to transfer only in the transfer layer in a section from where the image light enters the input area to where the image light exits the output area.

2. The hologram light guide plate according to claim 1, wherein the intermediate layer has a refractive index smaller than that of the glass layer, thereby totally reflecting the image light at a boundary surface between the glass layer and the intermediate layer.

3. The hologram light guide plate according to claim 2, wherein
  assuming that:
    a critical angle at which the image light totally reflects at the boundary surface is θc; and
    an angle between a proceed direction of the image light reflected at the boundary surface and the boundary surface is $\theta_F$,
  a refractive index of the intermediate layer is based on:

$$\theta_F < 90 - \theta c \text{ (degree)}.$$

4. The hologram light guide plate according to claim 1, wherein the protect layer includes an ultraviolet ray barrier layer which transparency against the image light is higher than that against ultraviolet ray.

5. The hologram light guide plate according to claim 4, wherein the ultraviolet ray barrier layer is formed by a multilayer including at least $SiO_2$.

6. The hologram light guide plate according to claim 1, wherein the protect layer includes a water vapor barrier layer that barriers water vapor.

7. The hologram light guide plate according to claim 6, wherein the water vapor barrier layer is formed by a film including polyvinylidene chloride.

8. The hologram light guide plate according to claim 1, wherein the hologram layer includes a monitor area that transmits external light and that transmits monitor light reflected from the hologram light guide plate.

9. The hologram light guide plate according to claim 1, further comprising a convex lens between the protect layer and the intermediate layer,
  wherein a surface of the convex lens contacting with the intermediate layer is flat, and a surface of the convex lens opposite to the intermediate layer is a convex surface.

10. The hologram light guide plate according to claim 1, wherein the intermediate layer is formed by a thermosetting resin.

11. The hologram light guide plate according to claim 1, wherein a refractive index of the intermediate layer is at or below 1.42.

12. A hologram light guide plate that guides image light to an eye, comprising:
  a hologram layer that converts a proceed direction of the image light by refractive index modulation;
  a glass layer that is placed at an external side of the hologram layer;
  a protect layer that is placed at an external side of the glass layer and that protects the hologram layer;
  an intermediate layer that is placed between the glass layer and the protect layer; and
  a water vapor barrier layer that barriers water vapor,
  wherein the hologram light guide plate includes an input area where the image light is incident onto the hologram light guide plate and an output area where the image light exits the hologram light guide plate,
  wherein the hologram layer and the glass layer form a transfer layer through which the image light transfers,
  wherein the intermediate layer causes the image light to transfer only in the transfer layer in a section from where the image light enters the input area to where the image light exits the output area, wherein the water vapor barrier layer includes a protruded portion, and wherein the water vapor barrier layer covers a side surface of the hologram layer and a side surface of the glass layer, and a top surface of the protruded portion is placed at a position contacting with the side surface of the hologram layer, thereby protecting the hologram layer from water vapor.

13. A head mount display equipped on a head of a user, comprising a hologram light guide plate that guides image light to an eye, the hologram light guide plate comprising:

a hologram layer that converts a proceed direction of the image light by refractive index modulation;

a glass layer that is placed at an external side of the hologram layer;

a protect layer that is placed at an external side of the glass layer and that protects the hologram layer; and an intermediate layer that is placed between the glass layer and the protect layer, wherein the hologram light guide plate includes an input area where the image light is incident onto the hologram light guide plate and an output area where the image light exits the hologram light guide plate, wherein the hologram layer and the glass layer form a transfer layer through which the image light transfers, wherein the intermediate layer causes the image light to transfer only in the transfer layer within a section from where the image light enters the input area to where the image light exits the output area, and wherein the head mount display further comprises:

a light guide prism that guides the image light toward the hologram light guide plate; and a monitor opening that transmits external light toward the light guide prism and that transmits monitor light reflected from the light guide prism.

14. The head mount display according to claim 13, wherein the light guide prism and the glass layer directly contact with each other.

15. A hologram light guide plate that guides image light to an eye, comprising an input area where the image light is incident onto the hologram light guide plate and an output area where the image light exits the hologram light guide plate, the hologram light guide plate further comprising:

a hologram layer that converts a proceed direction of the image light by refractive index modulation;

a glass layer that is placed at an external side of the hologram layer;

a protect layer that is placed at an external side of the glass layer and that protects the hologram layer;

an intermediate layer that is placed between the glass layer and the protect layer, a refractive index of the intermediate layer being smaller than that of the glass layer; and a dry area that is placed at a side surface of the glass layer and also at a side surface of the hologram layer, and that absorbs water vapor, wherein the hologram light guide plate includes an input area where the image light is incident onto the hologram light guide plate and an output area where the image light exits the hologram light guide plate, wherein the hologram layer and the glass layer form a transfer layer through which the image light transfers, and wherein the intermediate layer causes the image light to transfer only in the transfer layer in a section from where the image light enters the input area to where the image light exits the output area.

* * * * *